United States Patent
Rácz et al.

(10) Patent No.: US 9,113,356 B2
(45) Date of Patent: Aug. 18, 2015

(54) CONTROL OF DATA FLOWS OVER TRANSPORT NETWORKS

(71) Applicant: Telefonaktiebolaget L M Ericsson (publ), Stockholm (SE)

(72) Inventors: Sándor Rácz, Cegléd (HU); Szilveszter Nádas, Budapest (HU); Gergely Pongrácz, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 104 days.

(21) Appl. No.: 13/899,983

(22) Filed: May 22, 2013

(65) Prior Publication Data
US 2013/0322366 A1    Dec. 5, 2013

(30) Foreign Application Priority Data
May 29, 2012    (EP) .................................... 12169741

(51) Int. Cl.
*H04W 28/02* (2009.01)
*H04L 12/851* (2013.01)
*H04L 12/813* (2013.01)

(52) U.S. Cl.
CPC ........... *H04W 28/0268* (2013.01); *H04L 47/20* (2013.01); *H04L 47/2483* (2013.01); *H04W 28/0263* (2013.01)

(58) Field of Classification Search
CPC ............ H04L 63/0227; H04L 63/0236; H04L 63/0245
See application file for complete search history.

(56) References Cited

U.S. PATENT DOCUMENTS

| 8,446,832 | B2 | 5/2013 | Pongracz et al. | |
| 2007/0061433 | A1* | 3/2007 | Reynolds et al. | 709/223 |
| 2009/0086651 | A1* | 4/2009 | Luft et al. | 370/253 |
| 2010/0248643 | A1* | 9/2010 | Aaron et al. | 455/68 |
| 2010/0260048 | A1* | 10/2010 | Dolganow et al. | 370/235 |
| 2012/0047200 | A1* | 2/2012 | Szabo et al. | 709/203 |
| 2013/0170350 | A1* | 7/2013 | Sarkar et al. | 370/235 |

OTHER PUBLICATIONS

Martin Ljungberg et al., "Mobile Broadband Secondwave Differentiated Offerings", Ericsson Review (Incl. On) Telefonaktiebolaget L M Ericsson, SE Jan. 1, 2011, pp. 1-6, Retrieved from Internet: URL:http://liveweb.archive. org/http://www.ericsson.com/res/thecompany/docs/publications/ericsson_reveiw/2011/er_mobile_Broadband_2nd_wave.pdf [retrieved on Jan. 11, 2012].
Fabian Castro et al., "SAPC:Ericsson's Convergent Policy Controller", Ericsson Review (Incl. On), vol. 2010, No. 1, Jan. 1, 2010, pp. 4-9, ISSN: 0014-0171.

* cited by examiner

*Primary Examiner* — John Blanton
(74) *Attorney, Agent, or Firm* — Coats & Bennett, P.L.C.C.

(57) ABSTRACT

A method of preparing data packets for transport over a telecommunications transport network is disclosed. The data packets relate to different ones of a plurality of services. The method includes inspecting each of the data packets to identify the service to which the data packet relates. The identified service of the packet is mapped to a Quality of Service (QoS) type. A bandwidth profiling scheme is applied to the data packets, the profiling scheme identifying and marking each data packet according to whether or not the data packet conforms with a predetermined committed information rate for the QoS type. The marked data packets are forwarded for transport through the transport network. Related devices are also disclosed.

12 Claims, 7 Drawing Sheets

CONTROL OF DATA FLOWS OVER TRANSPORT NETWORKS

RELATED APPLICATIONS

The present application claims priority to EP Application No. 12169741.1, filed May 29, 2012, the disclosure of which is incorporated herein by reference in its entirety.

TECHNICAL FIELD

The present disclosure relates to improvements in the handling of data communications transmitted across a transport network.

BACKGROUND

A transport network (TN) is used to carry data signals between a Radio Base Station (RBS), such as a NodeB or an eNodeB in 3G Long-Term Evolution (LTE) networks, and a Serving gateway (S-GW) or Packet Data Network gateway (PDN-GW). A TN may be operated by a mobile network operator or by a third party transport provider. In the latter case there would be a Service Level Agreement, SLA, between the mobile and transport operators. With the rapid growth of digital data telecommunications following the introduction of 3G and 4G technology, TNs may frequently act as bottlenecks in the overall data transport process. Thus, various systems and methods have been proposed for improving or prioritizing the way that data packets are transported by the bearers.

Service differentiation in the Radio Access Network (RAN) is one supplementary means for more efficiently handling high volumes of traffic. As a simple example, using service differentiation a higher bandwidth share can be provided for a premium service, and in this way the overall system performance can be improved. As another example, a heavy service such as p2p (peer-to-peer) traffic, can be downprioritized. Implementing such service differentiation methods requires integration into the Quality of Service (QoS) concept of LTE and Universal Mobile Telecommunications System (UMTS) technology. Details of the QoS concept for LTE can be found in the $3^{rd}$ Generation Project Partnership (3GPP) Technical Specification TS 23.410, while for UMTS the QoS concept and architecture can be found in TS 23.107. The main idea of this concept is that services with different requirements use different bearers. This is illustrated in FIG. 1, which shows traffic flows between a User Equipment (UE) 10 and a PDN-GW 18 via an eNodeB 12, a TN 14, and a S-GW 16. FIG. 1 also shows the up-link (UL) traffic between the Application/Service layer 19 and the UE 10, as well as the downlink (DL) traffic between the Application/Service layer 19 and the PDN-GW 18.

When the UE 10 attaches to the network a default bearer is established (typically a best-effort service). However, if the UE invokes services having different QoS parameters, then dedicated bearers are established for each service, as shown by the parallel traffic flows in FIG. 1.

In International patent application No. PCT/EP2011/068023, the present inventors have described a mechanism for a per-bearer level service differentiation, that makes the bandwidth sharing among bearers more RAN-controlled. This is described further below in relation to FIG. 1. The mechanism employs the concept of "colour" profiling similar to that defined by the Metro Ethernet Forum (MEF) in "MEF 23, Carrier Ethernet Class of Service—Phase 1". As a way of indicating which service frames (or data packets) are deemed to be within or outside of the Service Level Agreement (SLA), colours are assigned to the data packets according to the bandwidth profile. Note that there is no technical significance to the colour itself, which is just used as a convenient way of describing and/or labeling the data packets. Levels of compliance are green when fully compliant, yellow when sufficient compliance for transmission but without performance objectives and red or discarded when not compliant with either. The data packets of a bearer are checked against the compliance requirements by a bandwidth profiler, for example a two-rate, three-color marker. This validation process can be used between two parties (e.g. between two operators) and can be part of the SLA. In general, in the SLA different requirements are set for green packets and yellow packets. The green packets are "more important" than the yellow packets. To reflect this difference between two types of packets, at a bottleneck point such as on entry to a TN, a colour aware active queue management discards yellow packets in preference to green packets when there is congestion (i.e. insufficient bandwidth available in the TN to transport all data packets). Thus, for each RB a predefined profiling rate (i.e. green rate) is assigned based on the Quality QoS Class Identifier (QCI) of the RB. This mechanism allows bandwidth guarantees to be provided for the RBs, at least to a certain degree.

FIG. 2 shows a schematic illustration of a TN employing bandwidth profiling for each of two bearers. The same entities shown in FIG. 2 have the same reference numerals. The example is shown of an LTE system with two bearers 202, 204 each carrying data packets between the PDN-GW 18 and eNodeB 12 via S-GW 16 and through TN 14. The Bearers 202, 204 are designated S5/S8 bearers 202a, 204a between the PDN-GW 18 and the S-GW 16, S1 bearers 202b, 204b from the S-GW 16 over the TN 14, and radio bearers 202c, 204c beyond the eNodeB 12. Each Bearer is assigned a bandwidth profiler—profiler 214 for bearer 202 and profiler 216 for bearer 204. Each of the bearers has an assigned QCI and an associated predefined 'green' rate (CIR). This example is of a single rate, two-colour profiler, in which data packets that are conformant with the green rate are designated as green packets 218, and packets that are not conformant are designated as yellow packets 220. For example, assume that the 'green rate' is 5 Mbps for a Bearer and the bitrate of this Bearer is about 7.5 Mbps. In this case, approximately ⅓ of the packets of the Bearer will be assigned to 'yellow'.

The TN bottleneck active queue management can then use the colour information marked in the data packets when choosing which packets to drop when there is insufficient bandwidth (congestion). The first packets to be dropped will be the 'yellow' packets 220.

In the example described, when the profiler 214, 216 assigns a Packet either 'green' or 'yellow', this means that the packet is marked with the conformance information in such a way it can be used at the TN bottleneck buffer(s). For example the Drop Eligibility (DEI) bit of the packet's Ethernet frame, or the Differentiated Services Control Point (DSCP) field in the IP header could be used to indicate if a packet has been assigned 'green' or 'yellow'.

The colouring concept is used in PCT/EP2011/068023 for improving per-service or per-bearer fairness at a bottleneck. The colouring concept is used in a different way for a different purpose and at a different location (i.e. it is done in the RAN node instead of in the Mobile Back Haul, MBH, node). In this case when a bearer has yellow packets that means that it has a higher bandwidth than the desired value (but gains from this higher bandwidth when the data packets are transported through the bottleneck), so the drop of these yellow packets probably does not have a serious negative impact on the service performance. Consequently, in this case, the use of green and yellow packets improves the fairness of resource sharing among user services.

Even if service differentiation is not required (e.g. there is equal sharing) very unfair situations can still arise. In a RAN TN a single aggressive user (i.e. bearer) using many parallel flows can throttle the TN, as shown in FIG. 3. The left-hand illustration shows an aggressive user with four parallel Transport Control Protocol (TCP) flows leaving very little capacity available for other (normal) users. The right-hand illustration in FIG. 3 is shown for comparison only for the much fairer situation that arises in an Asymmetric Digital Subscriber Line (ADSL), in which both an aggressive user (4 TCP flows) and a normal user take up the same amount of TN capacity.

The unfairness depicted in FIG. 3 can be solved by applying flow control or traffic profilers as described above. However, these solutions cannot overcome the fair usage problem within a single bearer. There are many networks in use today that do not support use of network initiated secondary bearers, particularly those using High Speed Packet Access (HSPA) equipment. In-bearer unfairness is a very similar problem to that illustrated in FIG. 3—i.e. an aggressive service using many parallel flows can throttle other services. In addition, even where all users are well-behaved and there is no aggressive throttling of a TN, existing methods do not provide for any differentiation of resource sharing, such that lower priority services suffer more degradation regardless of which user they belong to.

The current 3GPP-defined QoS-based solutions also share a common problem with the 3GPP defined QoS architecture, which is the need for extensive signaling between nodes and the added complexity of an Rx interface. The QoS-based solution is difficult for third party service providers to implement and requires extra nodes and a heavy signaling overhead making it expensive for the operators in terms of performance and maintenance.

SUMMARY

In one aspect, the claimed solution provides a method of preparing data packets for transport over a telecommunications transport network. The data packets relate to different ones of a plurality of services. The method includes inspecting each of the data packets to identify the service to which the data packet relates. The identified service of the packet is mapped to a Quality of Service (QoS) type. A bandwidth profiling scheme is applied to the data packets, the profiling scheme identifying and marking each data packet according to whether or not the data packet conforms with a predetermined committed information rate for the QoS type. The marked data packets are forwarded for transport through the transport network.

In another aspect, the claimed solution provides a network entity of a telecommunications network that provides data packets for transport through a transport network. The data packets relate to different ones of a plurality of services. The network entity includes a packet inspection engine configured to inspect each of the data packets to identify the service to which the data packet relates. A mapping module is configured to map the identified service of the packet to a Quality of Service, (QoS) type for the packet. The network entity also includes an interface over which data packets are provided to a bandwidth profiler for applying a bandwidth profiling scheme to the data packets. The data packets are provided to the profiler together with an indication of the QoS type of the data packet.

The network entity may further include the bandwidth profiler, which is configured to apply the profiling scheme. The bandwidth profiler identifies and marks each data packet according to whether or not the data packet conforms with a predetermined committed information rate corresponding to the QoS type.

In another aspect, the claimed solution provides a network entity of a telecommunications network that provides data packets for transport through a transport network. The data packets relate to different ones of a plurality of services, the network entity includes an interface over which data packets are received from a packet inspection engine. The packets are received together with an indication of a Quality of Service, QoS, type assigned to the data packet based on a service to which the packet relates, identified by the packet inspection engine. The network entity includes a bandwidth profiler applying a bandwidth profiling scheme to the data packets. The profiling scheme identifies and marks each data packet according to whether or not the data packet conforms with a predetermined committed information rate for the QoS type identified by the QoS tag.

It is an advantage that the approach is different to the standard, multiple-bearer based 3GPP QoS method in that only a single (default) bearer needs to be used. By employing a service identification method for the data packets, the same QoS can be guaranteed and fair-usage methods can be applied at a per-user and per-service level. As a consequence the number of situations where secondary bearer based QoS and associated signaling are required is substantially reduced. Also, the methodology allows for the provision of Differentiated Services, such as QoS guarantees for selected services (which is similar to a strict QoS-based approach as long as the total bandwidth of the guaranteed services does not exceed the bottleneck capacity).

In addition, the functionality required to carry out the method is very flexible, and may be provided in any one or more of a number of network devices. The claimed solutions are applicable in any common RAN TN with LTE and HS nodes.

DETAILED DESCRIPTION

In the following description, both methods and apparatus, such as network entities, equipment or hardware, employing functionality for performing the methods are disclosed. The term mechanism is used, and, unless indicated otherwise, should be understood to refer generally to both method(s) and apparatus.

The embodiments described below apply a "QoS-type" based bandwidth profiler to control resource sharing between different services. The QoS-type is determined from an inspection of the data packets, which in this example is a Deep Packet Inspection (DPI) functionality (i.e. a DPI engine) in either the PDN or the Serving gateway, or if the method is used to control HSPA, in the RNC. The DPI engine identifies the service that a given packet belongs to, and applies a mapping from the service to the QoS-type. This mapping, or classification of the service, can also take other performance and policy measures into account (e.g. system load, terminal type, user subscription level).

Once the QoS-type is available, the data packet is propagated to the profiler, which uses it as an input to assign the appropriate colour to the packet. In this way the TN bandwidth resource usage can be shared fairly between the different services (such that, for example, a p2p download will not suppress an online gaming session). It is also possible to directly influence the profiler output by designating some protocols as low priority, which in turn will affect per-service bandwidth sharing between different users. When the data packet is then forwarded to the TN bottleneck, the colour assigned to it by the profiler is used by the colour-aware queue manager at the TN bottleneck for the dropping of data packets when there is congestion.

Figure 4:
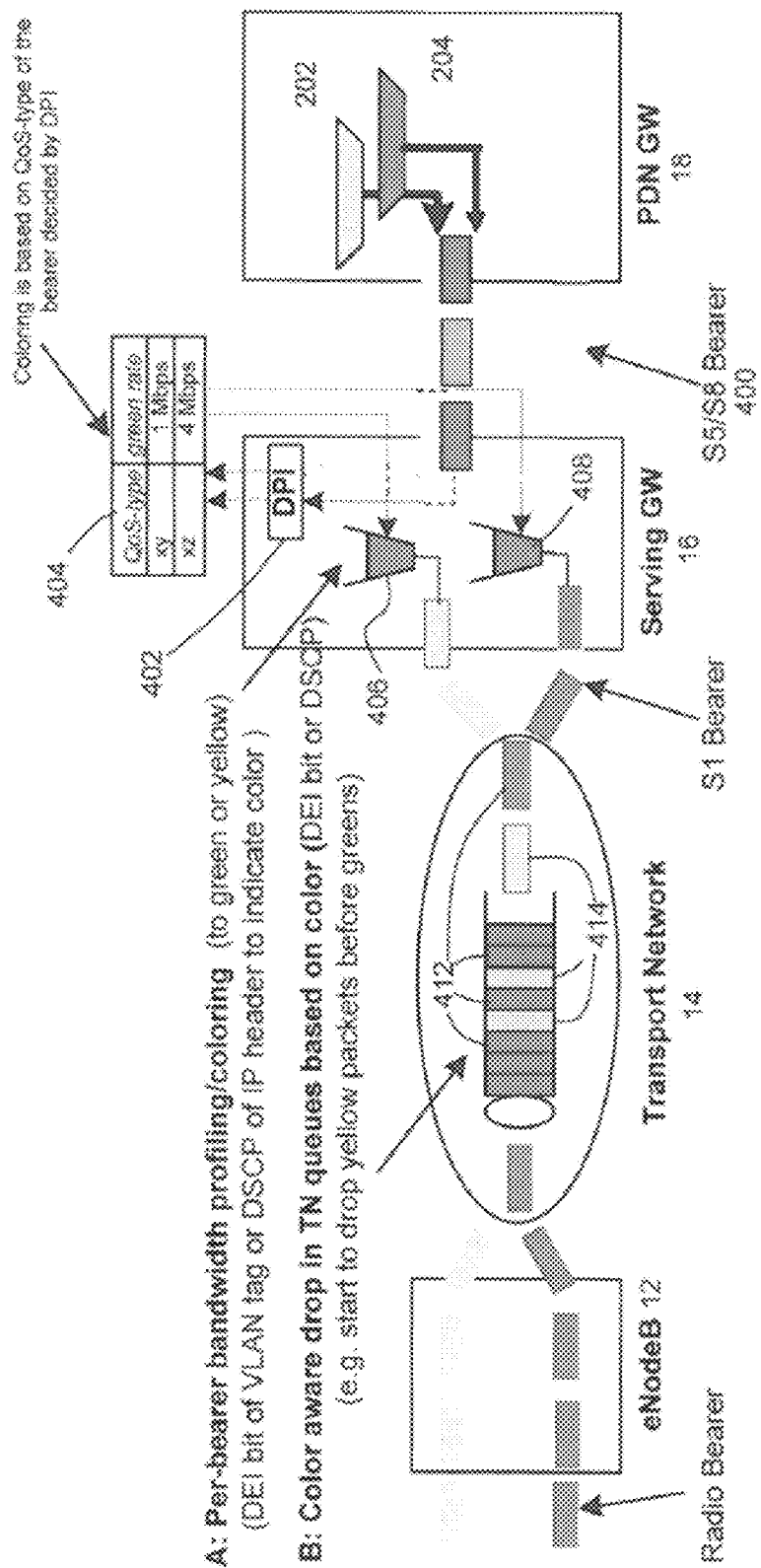
FIG. 4 is a schematic illustration of a TN employing a single bearer, per-service bandwidth profiling mechanism.

The mechanism is illustrated in FIG. 4, in which the equivalent features described above and shown in FIG. 2 have the same reference numerals. In this case data packets relating to two services 202, 204 at the PDN gateway 18 are sent towards the TN 14 in a single (e.g. default) bearer 400. At the Serving gateway (S-GW) 16 all the data packets of the bearer 400 are examined by a DPI engine 402 to determine which of the services the data packet relates. More features relating to the DPI engine 402 are discussed below. The DPI engine also includes, or accesses, a mapping module 404, which applies a mapping of the identified service to which the data packet relates onto a QoS-type. In the example depicted there are two QoS-types, each corresponding to one of the two services 202, 204. However, it will be appreciated that many more QoS-types could be used corresponding to data packets of multiple services.

At this point the data packets are conceptually separated according to their identified QoS-type, such that each data packet is processed by a colour profiler 406, 408 that corresponds to the QoS-type. This may be done by attaching a QoS-type tag to the data packet that identifies the QoS-type of the data packet. Alternatively, the S-GW 16 may be configured to keep track of the QoS-type of each data packet while it is still being processed at the S-GW 210. Note that in an alternative embodiment the packet inspection could take place in another entity, for example the PDN-GW 18, with further functionality (e.g. the profiling to be described below) carried out in the S-GW 16. In that case the QoS-type tag would be required for the S-GW 16 to know the QoS-type of the data packet. Each of the QoS-types has an associated "green" rate, or CIR. Thus, in the example depicted there are two green rates. The green rate associated with the QoS-type of a data packet is then used by the corresponding colour profiler 406, 408 to mark the packet as either a "green" data packet (i.e. conformant with the CIR for that QoS-type) or as a "yellow" data packet (not conformant with the CIR for that QoS-type).

Note that here FIG. 4 shows the data packets as being divided into two parallel streams. However, there are not two separate bearers, and no parallel processing of the data packets. Rather, the "bearers" only exist virtually (or conceptually) inside one physical default bearer. Selecting the right virtual bearer is done by the DPI engine, e.g. by attaching the QoS tags to the packets. Similarly, for clarity, FIG. 4 illustrates two separate colour profilers. In reality these would be implemented in software and could be considered as a single profiler module configured to apply the appropriate colour profiling/green rate to the data packets based on the QoS-type assigned to the data packets.

The data packets are then forwarded to the TN 14, where colour-aware dropping of data packets may be performed such that, when there is congestion at the bottleneck, "yellow" data packets are dropped first (as described above for FIG. 2). As shown in FIG. 4, the data packets being transported through the TN 14 include green packets 412, as well as some yellow packets 414. However, the packets may be green or yellow packets relating to either of the services 202, 204, although it is more likely that a yellow packet will relate to a service that has a QoS-type with a lower designated green rate (i.e. a lower priority service).

The DPI engine 402 is used to identify the service to which a data packet relates, such that packets that relate to services requiring a higher priority can be identified and treated accordingly. This has the advantage that it works without the need for cooperation between the service provider and the operator, which might not be feasible as the service providers are often small companies running a few servers in a datacenter. Thus, the ability to provide high quality "niche market" services could be seen as a differentiator between operators. As the operator already has the DPI functionality in place, this solution does not impose extra installation cost. However operating the full functionality of the DPI engine (the full DPI stack) can be costly in terms of dataplane processing when there is a high bandwidth requirement. Therefore, if a service becomes very popular, producing heavy traffic, it may be worthwhile for the operator to negotiate an agreement with the given service provider.

DPI engines are typically constructed in a way that processing header-only rules (e.g. IP address, port) is relatively cheap, while going deeper (e.g. pattern matching on payload, protocol state machines) is much more expensive. Therefore, the mechanisms described may be implemented through an Application Programming Interface (API) that is flexible enough, but does not require very sophisticated, hard-to-process rules in the DPI engine. The lightweight rules might typically be TCP/IP (or UDP/IP) based rules, most likely including specification of the IP address(es) used by the provider's server(s), whether the service is TCP or User Datagram Protocol (UDP) based, and the port or port range used by the given service. In addition, a service provider might choose a payload pattern to identify the service. Although identifying a payload pattern requires a deeper inspection, the overhead can be minimal if the pattern is found in the first few bytes of the flow. This is because a TCP/IP or UDP/IP flow is always uniquely described by its "5 tuple": source/destination addresses and ports, and protocol. Once the pattern is found for a flow, the result can be stored with the 5 tuple, making it very quick to classify further data packets for that flow. This way byte by byte inspection is avoided for the rest of the packets in the flow. This also makes the API very flexible.

The solution has the advantage, that it can be applied in stages. In a first stage, when there is an emerging service, "deep" methods may be employed, such as payload based pattern matching, connection tracking, or feature based classification. At a later stage, if the service becomes popular and/or the service provider requires QoS guarantees, the operator and the provider could agree on a "shallow" inspection rule. This is good for the operator because the load on the DPI engine can be decreased and it is also good for the service provider because, in general, "heavy" DPI methods require more packets to be inspected before the QoS-type determination can be made, meaning that those packets are not sent through the high priority QoS-type profiler (but instead would be sent through a default, low-priority profiler).

Figure 1:
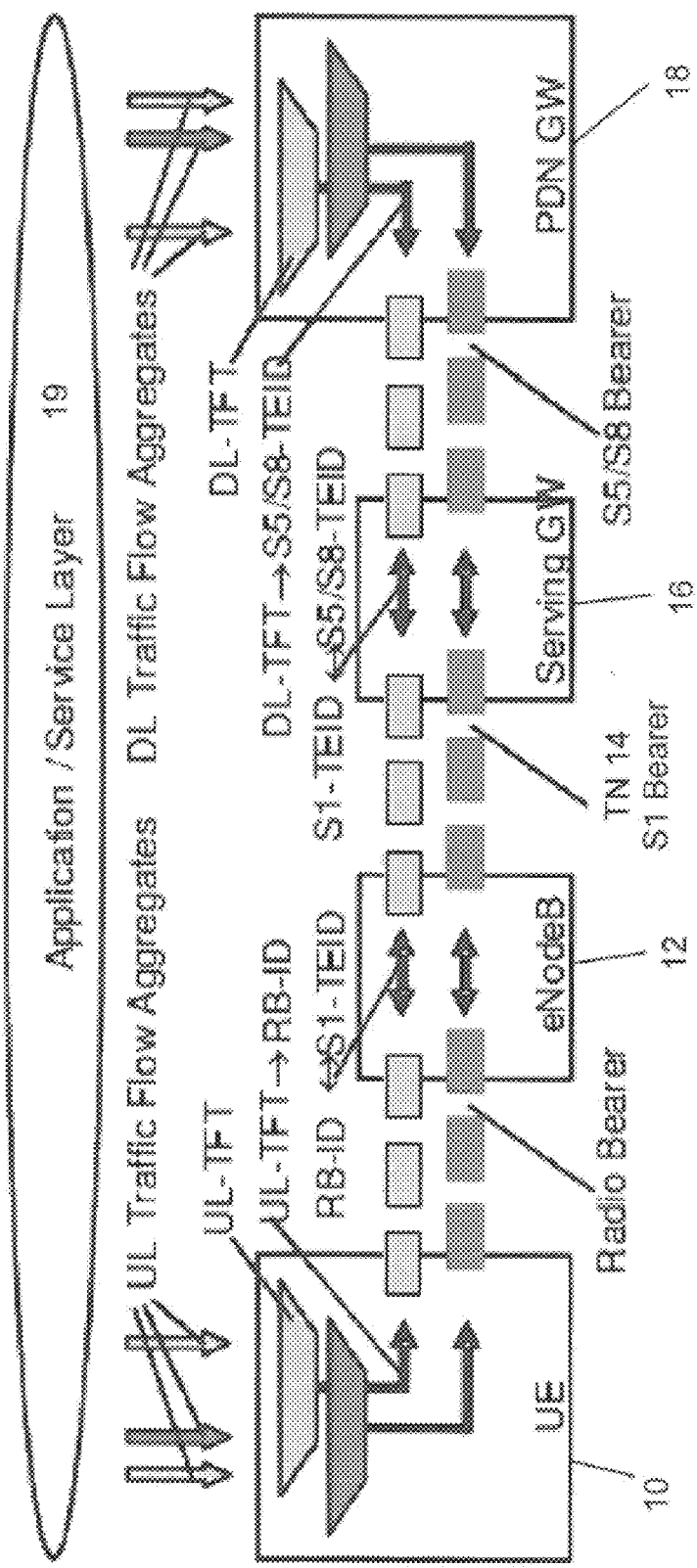
FIG. 1 is a schematic illustration showing transport of data packets of bearers over a Transport Network (TN).
Figure 2:
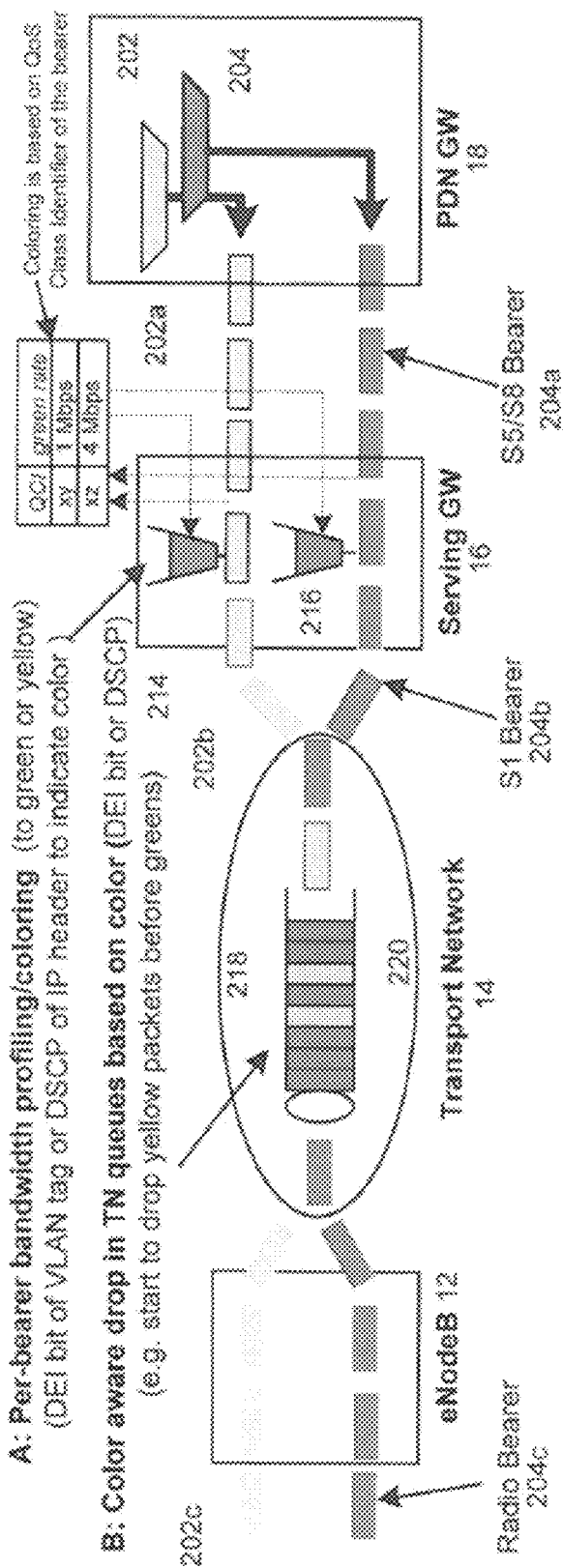
FIG. 2 is a schematic illustration of a TN employing a known per-bearer bandwidth profiling mechanism.
Figure 3:
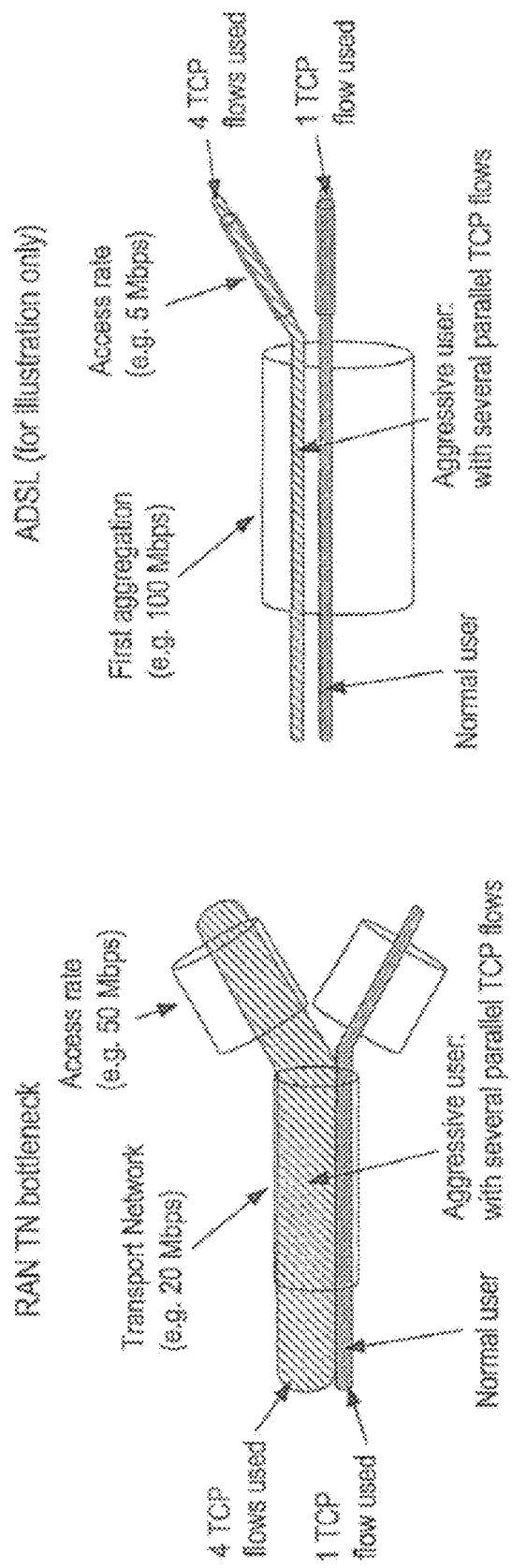
FIG. 3 is a schematic illustration comparing a RAN TN bottleneck with an ADSL.
Figure 5:
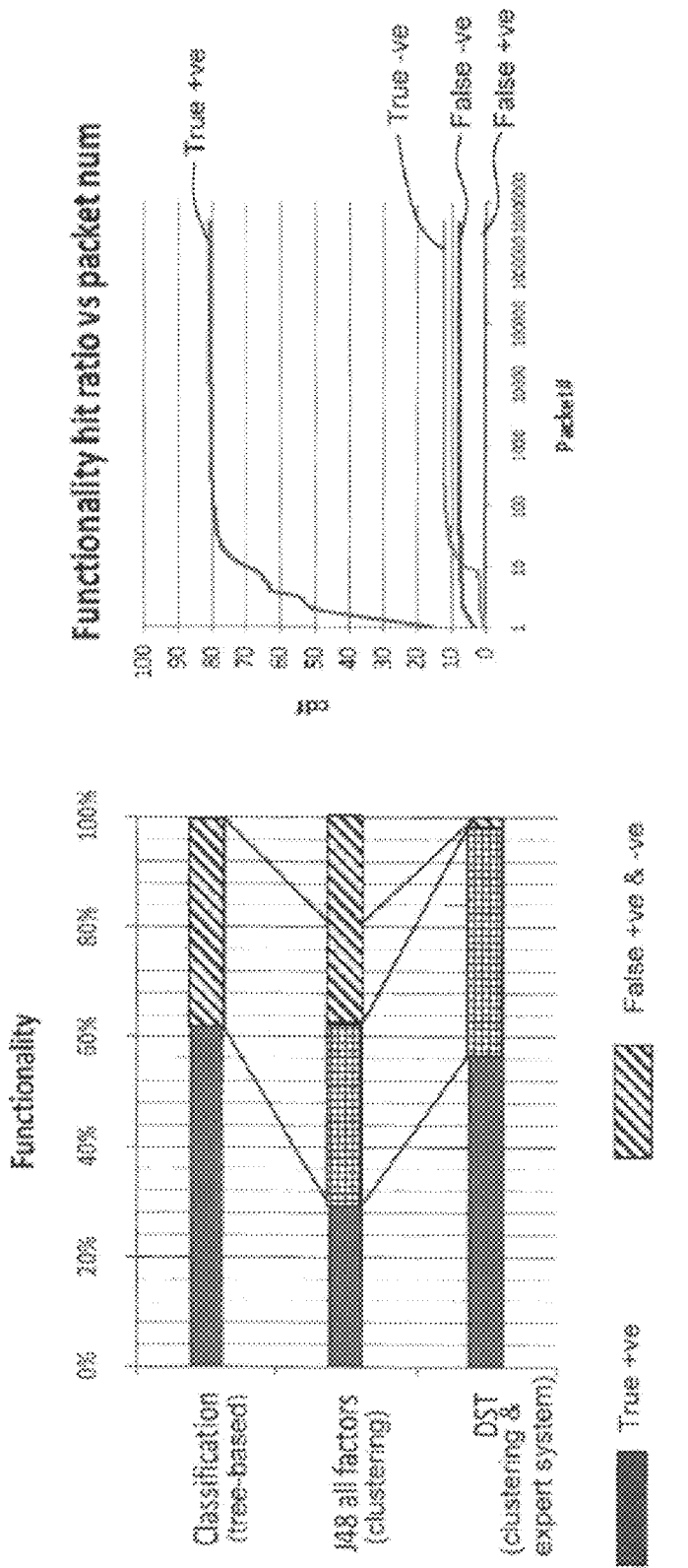
FIG. 5 shows two graphs illustrating examples of the accuracy and detection speed in a DPI engine.

The details of the colour profiling mechanism are similar to those described in the background section above (in relation to FIG. 2). However, there are a few points that should be noted. Firstly, the inspection based methods (e.g. DPI) may not guarantee 100% accuracy in determining the service to which each data packet relates. In particular, the determination cannot be guaranteed for the first packet of the traffic flow. This means that, particularly in the early stages, the QoS-type assigned to data packets in the traffic from a given service will be divided between its correct QoS-type and the best effort bearer's QoS-type (i.e. the default). FIG. 5 illustrates graphically examples of the accuracy and detection speed using a number of different feature based algorithms. The left-hand graph is a bar chart illustrating the hit ratios for different decision algorithms. For a tree-based classification algorithm (top bar) there is a 62% correct classification, and 38% error rate. A clustering based algorithm (middle bar) has nearly 63% correct (divided equally between true positive and true negative classifications) and 37% error rate (false negative and false positive). A combined clustering and expert system based algorithm (bottom bar) has 99% correct (true positive and true negative). An error means that the classifier either confused the service with another service, or it simply wasn't able to classify it.

The right hand graph provides an illustration showing an example of detection speed using a feature-based DPI algorithm. The cumulative distribution function (CDF) is plotted for each of the true positive, true negative, false positive and false negative classifications as a function of packet number. As can be seen, 100 packets or more are classified before a steady condition is achieved in which most packets are classified correctly (true positive and true negative), although the false negatives continue at a steady rate. Note that with pattern or protocol parsing based DPI the detection speed can be much higher (usually 1-3 packets are needed), while header rule based classification (e.g. ACL rules) can make a correct decision even for the very first packet. Feature/metrics based DPI on the other hand is usually much slower, as the graphs of FIG. 5 show.

Because there may always be data packets where the DPI engine cannot make a determination of the service (i.e. no rules, no patterns, etc. from which it can determine the service such that no QoS-type can be assigned), the DPI engine can be configured to constantly monitor this "unknown" portion of the traffic. When the DPI engine cannot make a determination of the service, it may increase an "unknown" counter. An Unknown Rate (e.g. the ratio of "unknown"/"unknown+ known") can then be calculated. It is also possible to monitor the detection speed. This may be done by counting the number of "not yet classified" data packets when the flow ends (either normally or by timeout). A "not yet classified"/"all" ratio for each QoS-type can then be updated. If the flow was not classified (i.e. the flow ended before a classification could be made) this step should be skipped. If it was classified, the count of the number of "not yet classified" data packets is added and the "not yet classified"/"all" ratio (NonClassifiedRate) is refreshed for each QoS-type.

The monitoring ratios can then be used to fine-tune the bandwidth profilers. Note that in the above case both the "unknown" and "not yet classified" traffic goes to the default profiler. The "Unknown" traffic presents a problem because it can contain non best-effort traffic, but the amount is not known. Two possible ways to handle this problem are: (1) if the traffic cannot be identified, it can be assumed that it definitely does not belong to a high QoS-type; and (2) the share of a given QoS-type's traffic that is unclassified is assumed to be approximately the same as in the classified traffic of the user (QoSTrafficShare).

The bandwidth profiler can then determine how much traffic from each of the QoS classes was non-classified. Thus, for a QoS-type x, the amount of traffic that is carried non-classified (i.e. sent to the Best Effort, or default, profiler) is given by:

$$QoSonBE_x = NonClassifiedRate_x + F \times (UnknownRate \times QoSTrafficShare)$$

where F is a flag (F=1, or F=0) for selecting whether it is believed that the unknown data packets include data packets for the QoS-type x packets.

In order to fine tune the profiler, it first has to be informed about the values of these ratios (UnknownRate and NonClassifiedRate). This could be done using either a lightweight signaling approach, or an approach based on a report+configuration change. Which approach is selected could be based on a statistical parameter such as the variance of $QosOnBE_x$. If it is nearly constant over a long period, the report+configuration based solution could be preferred as it may also contain some measurement results from the "misclassified" portion of data packets. There is a certain probability that data packets will be misclassified especially when using feature based classification. The profiler of the best effort class then can be set according to $Sum(QoSOnBE_x)$. The bandwidth defined for the best effort class should be increased by $1/(1-Sum(QoSOnBE_x))$.

Figure 6:
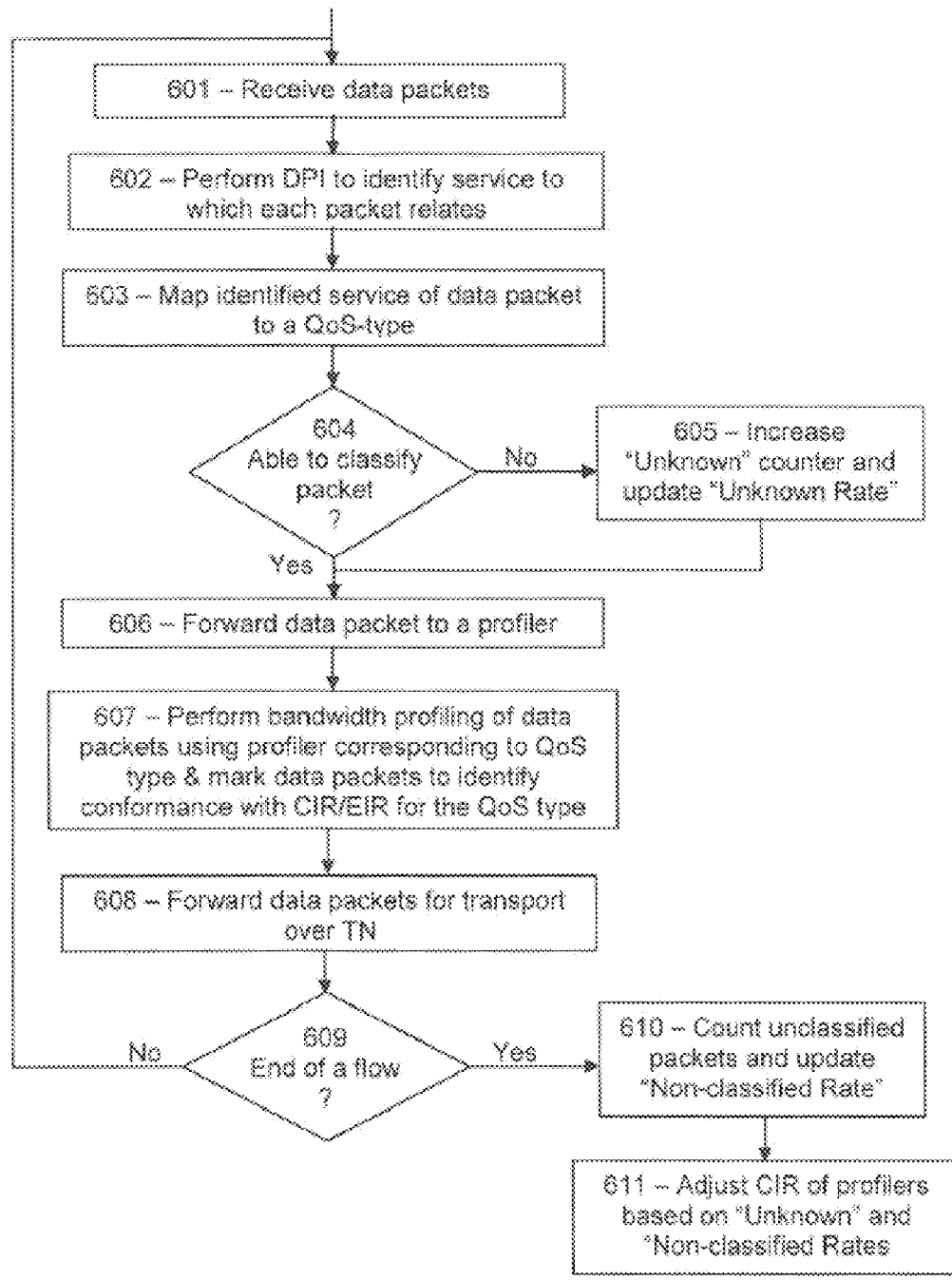
FIG. 6 is a flow diagram illustrating the principal steps in a method of per-service bandwidth profiling.

FIG. 6 is a flow diagram illustrating the principal process steps in the mechanisms described above. At step 601, data packets in a flow are received at a gateway node (e.g. S-GW or PDN-GW) prior to being sent over a TN. At step 602 a DPI engine inspects each packet to identify a service to which the packet relates. At step 603 a mapping is performed to assign a QoS-type for the data packet based on the identified service (i.e. to classify the data packet). At step 604, for each data packet, a question is posed as to whether the DPI mapping steps were able to classify the data packet (i.e. to identify a specific service, and assign a corresponding QoS type). If the packet could not be classified, the QoS-type for the packet will indicate this, and the packet will be sent over the TN using a default, or Best Effort, service. In that case, at step 605 the "Unknown" counter is incremented, and the "Unknown Rate" updated accordingly.

At step 606 the data packets are forwarded to the appropriate profiler (based on the assigned QoS-type). At step 607 bandwidth profiling is performed for each data packet by the appropriate profiler identified by the QoS-type, such that data packets that are conformant with the CIR (green rate) are coloured green, or otherwise coloured yellow, as described above. At step 608 the packets are forwarded to transport over the TN, where if there is congestion yellow packets are discarded first.

At step 609, a question is asked as to whether a flow (i.e. the flow of packets relating to a particular service) has come to an end. If not, then the procedure returns to step 601 to continue the receiving and processing of incoming data packets. If a flow has ended, then at step 610 a count is made of the number of not yet classified data packets, and the "Non-classified rate" is updated, as described above. At step 611, the profilers can then fine-tune their green rates (CIRs) based on the updated "Unknown" and "Non-classified" rates.

Figure 7:
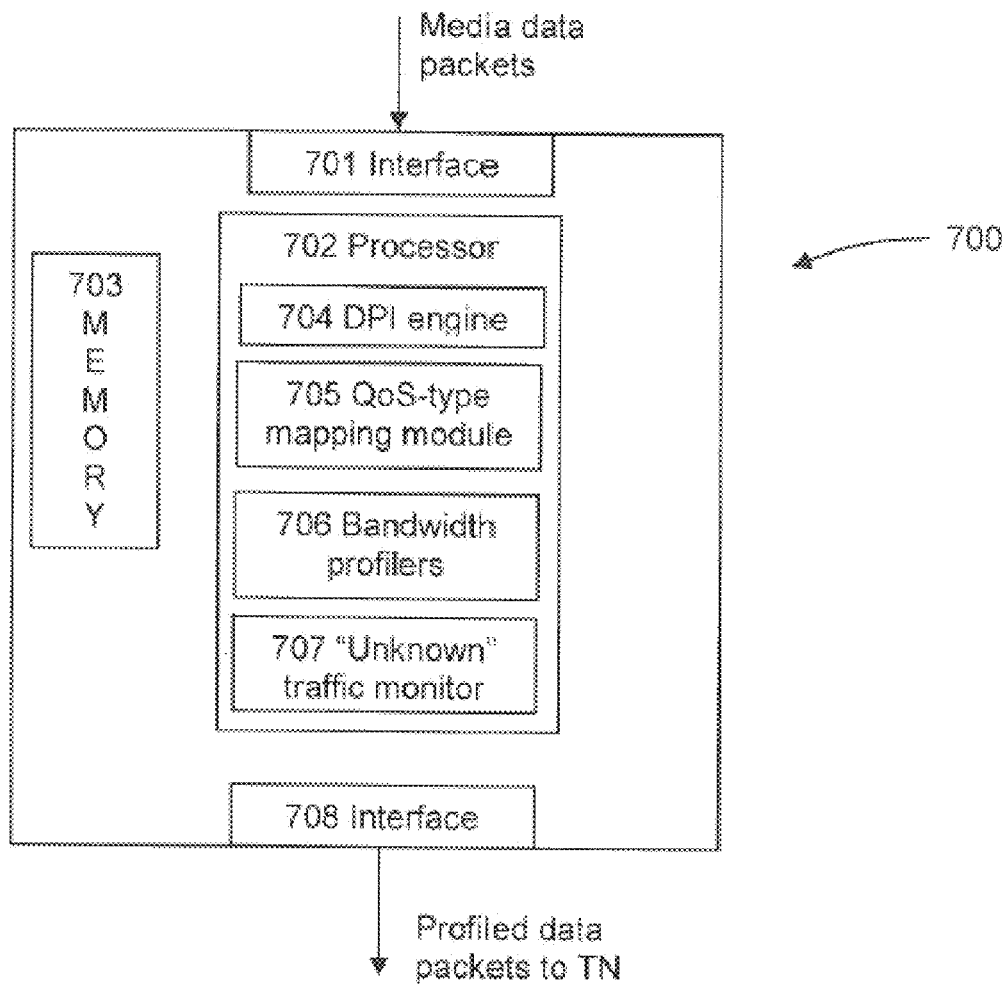
FIG. 7 is a block diagram illustrating functional components in a network entity configured for use with a per-service bandwidth profiling mechanism.

FIG. 7 is a block diagram illustrating the principal hardware features of a network entity (for example a S-GW or PDN-GW) 700 applying the mechanisms described above. The entity includes an interface 701 through which arrive media data packets of one or more services carried by a bearer, and which are destined to be transported over a TN. The network entity 700 also includes another interface 708 through which media data packets are forwarded on to the TN. The network entity 700 also includes a processor 702 and a memory 703 storing data and programming instructions for the processor. The processor 702 includes: a DPI engine 704 that inspects each of the data packets to determine the service to which the packet relates; a mapping module 705 that assigns a QoS-type to the data packet based on the identified service colour profiling to the data packets of each of the bearers; and a number of bandwidth profilers 706, one for each QoS-type. The profilers 706 identify and mark each data packet as green or yellow according to whether or not the packet is conformant with the CIR (green rate) of the profiler for the QoS-type of the data packet. The marked data packets are forwarded via interface 708 for transport through the transport network.

The processor 702 also includes an "Unknown" traffic monitor that monitors the unclassified data packets and updates the "Unknown" and "Non-classified" Rates. This information is fed back to the profilers 706 so that they can fine-tune their green rates.

Note that although the DPI engine 704, mapping module 705, bandwidth profilers 706 and "Unknown" traffic monitor 707 are all shown in the single entity 700, one or more of these components could be situated in separate entities, with data being passed from one entity to the other. For example, the DPI engine 704 and mapping module 705 could be located in one entity (e.g. the PDN-GW) while the bandwidth profilers 706 are located in another entity (e.g. the S-GW). The "Unknown" traffic monitor could be in either entity (or in another, separate entity). Where the components are located in separate entities, then the relevant data is forwarded from one entity to the other via the interface 708.

The mechanisms described solve the unfairness problem, not just on per-user, but also on a per-service basis inside one bearer. Thus secondary bearers are not a requirement. As referred to previously, the current 3GPP-defined QoS-based solutions have a problem with extensive signaling and added complexity of an Rx interface, making it difficult and expensive for third party service providers to implement. With the presently claimed solution, a service provider may choose between a "heavyweight" 3GPP solution that provides a very detailed QoS for only a subset of its users/terminals, and a packet inspection based method which would work for all users and does not require any implementation by the service providers or terminal vendors.

What is claimed is:

1. A method of preparing data packets for transport over a telecommunications transport network, wherein the data packets relate to different ones of a plurality of services, the method being implemented by a first network node and comprising:
    inspecting each of the data packets within a given bearer that includes data packets for multiple services, wherein the inspecting comprises, for each of the data packets, identifying the service to which the data packet relates;
    mapping the identified service of each data packet to a Quality of Service (QoS) type;
    applying a bandwidth profiling scheme to the data packets, the profiling scheme identifying and marking each data packet according to whether or not the data packet conforms with a predetermined committed information rate (CIR) for the QoS type of its identified service; and
    forwarding the marked data packets in a single bearer for transport through the transport network, thereby enabling a second network node that is different from the first network node to selectively drop data packets at the transport network that do not conform with their associated CIR based on the marking.

2. The method of claim 1, wherein the inspecting the data packets comprises using a Deep Packet Inspection (DPI) engine.

3. The method of claim 2, wherein the DPI engine is configured to:
    inspect a packet header only to identify data packets that relate to certain services; and
    perform a deeper packet inspection to identify data packets of other services.

4. The method of claim 3, wherein the deeper packet inspection comprises one or more of payload based pattern matching, connection tracking, and feature-based classification.

5. The method of claim 1, further comprising monitoring the detection speed and accuracy of the packet inspection.

6. The method of claim 5, further comprising adjusting the committed information rate of one or more of the QoS types based on the monitoring.

7. The method of claim 5, wherein monitoring the accuracy of the packet inspection includes determining an "unknown rate" based on a quantity of data packets where the service to which the packets relate could not be identified.

8. The method of claim 5, wherein monitoring the speed of the packet inspection includes determining a "non-classified rate" based on a number of data packets where the service to which the packets relate has not yet been determined when the flow of data packets for a service ends.

9. The method of claim 1,
    wherein, if there is insufficient bandwidth available in the transport network to transport all data packets, the second network node discards data packets identified by the profiling and marked as not conforming with the committed information rate before any data packets marked as conforming with the committed information rate are discarded.

10. A network entity of a telecommunications network that provides data packets for transport through a transport network, wherein the data packets relate to different ones of a plurality of services, the network entity comprising:
    one or more processing circuits configured to operate as:
        a packet inspection engine configured to inspect each of the data packets within a given bearer that includes data packets for multiple services, wherein the inspection identifies, for each of the data packets, the service to which the data packet relates;
        a mapping module configured to map the identified service of each data packet to a Quality of Service (QoS) type for the packet; and
        a bandwidth profiler configured to apply a bandwidth profiling scheme to the data packets that identifies and marks each data packet according to whether or not the data packet conforms with a predetermined committed information rate (CIR) for the QoS type of its identified service; and
    interface circuitry operatively connected to the one or more processing circuits and configured to forward the marked data packets in a single bearer for transport through the transport network, thereby enabling a second network node that is different from the first network node to selectively drop data packets at the transport network that do not conform with their associated CIR based on the marking.

11. The network entity of claim 10, wherein the packet inspection engine is a Deep Packet Inspection (DPI) engine.

12. The network entity of claim 10, wherein the network entity is a Packet Data Network Gateway, a Serving Gateway, or a Radio Network Controller in a High Speed Packet Access network.

* * * * *